US012750322B2

(12) United States Patent
Zhong et al.

(10) Patent No.: US 12,750,322 B2
(45) Date of Patent: Sep. 29, 2026

(54) PACKET PROCESSING CONFIGURATIONS

(71) Applicant: Intel Corporation, Santa Clara, CA (US)

(72) Inventors: Luyao Zhong, Beijing (CN); Ruijing Guo, Shanghai (CN); Yongli He, Beijing (CN); Hejie Xu, Beijing (CN); Ziye Yang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/971,438

(22) Filed: Oct. 21, 2022

(65) Prior Publication Data

US 2023/0043461 A1 Feb. 9, 2023

(30) Foreign Application Priority Data

Sep. 23, 2022 (WO) ................ PCT/CN2022/120723

(51) Int. Cl.
*H04L 47/62* (2022.01)
*H04L 49/90* (2022.01)

(52) U.S. Cl.
CPC ........ *H04L 47/621* (2013.01); *H04L 49/9068* (2013.01)

(58) Field of Classification Search
None
See application file for complete search history.

(56) References Cited

U.S. PATENT DOCUMENTS

| | | | | |
|---|---|---|---|---|
| 10,754,661 | B1 * | 8/2020 | Righi | H04L 63/0236 |
| 11,540,009 | B2 * | 12/2022 | Sidhu | H04N 21/434 |
| 2015/0063367 | A1 * | 3/2015 | Griswold | H04L 49/9063 370/412 |
| 2019/0116063 | A1 * | 4/2019 | Bottorff | H04L 47/2483 |
| 2020/0344182 | A1 * | 10/2020 | Tsirkin | G06F 9/45558 |
| 2021/0211408 | A1 * | 7/2021 | Porras | G06N 3/045 |
| 2021/0243247 | A1 * | 8/2021 | He | H04L 67/10 |
| 2023/0066013 | A1 * | 3/2023 | Ball | G06F 21/606 |
| 2023/0088222 | A1 * | 3/2023 | Tangudu | H04L 12/66 370/230 |
| 2023/0198964 | A1 * | 6/2023 | Viswambharan | G06F 21/606 713/168 |

FOREIGN PATENT DOCUMENTS

WO WO-2021252004 A1 * 12/2021 ............. H04L 45/60

OTHER PUBLICATIONS

Enberg et al., "Partition-Aware Packet Steering Using XDP and eBPF for Improving Application-Level Parallelism", Dec. 9, 2019, ENCP '19, All pages. (Year: 2019).*

(Continued)

*Primary Examiner* — Otis L Thompson, Jr.
(74) *Attorney, Agent, or Firm* — Compass IP Law PC

(57) ABSTRACT

Examples described herein relate to an interface and a network interface device coupled to the interface and comprising circuitry. In some examples, the circuitry is to receive packet data to be egressed, wherein the packet data does not specify a destination for the packet data and process the packet data to be egressed to generate a mapping of ingress packet-to-target based on a determination.

20 Claims, 9 Drawing Sheets

(56) References Cited

OTHER PUBLICATIONS

Brouer, Jesper Dangaard, "XDP (eXpress Data Path) as a building block for other FOSS projects", Red Hat, LLC, Lund, Sweden, May 2019, 27 pages.
Intel 710 Series, "Intel® Ethernet Controller X710/XXV710/XL710 Datasheet", Ethernet Products Group (EPG), Revision: 4.1, Jun. 2022, 1871 pages.
Intel Corporation, "i40e Linux Base Driver for the Intel® Ethernet 700 Series", https://downloadmirror.intel.com/732255/readme.txt, Feb. 24, 2022, 35 pages.
Intel Corporation, "ice Linux Base Driver for the Intel® Ethernet 800 Series", https://downloadmirror.intel.com/709704/readme.txt, Dec. 10, 2021, 44 pages.
Intel, "Intel® Ethernet Server Adapter X520 for OCP", Product Brief Intel® Ethernet 500 Series Network Adapters, Jan. 2021, 5 pages.
Mellanox Technologies, "User Manual for Mellanox ConnectX®-3, ConnectX®-3 Pro, ConnectX®-4, ConnectX®-4 Lx, ConnectX®-5 and ConnectX®-5 Ex Ethernet Adapters for Dell EMC PowerEdge Servers", Rev 2.0, © Copyright 2020. Mellanox Technologies Ltd, 223 pages.
Robison, Clayne B., "How to Set Up Intel® Ethernet Flow Director", https://www.intel.com/content/www/us/en/developer/articles/training/setting-up-intel-ethernet-flow-director.html, Updated Jun. 30, 2017, 4 pages.
Bianconi, Lorenzo, "Receive Side Scaling (RSS) with eBPF and CPUMAP", https://developers.redhat.com/blog/2021/05/13/receive-side-scaling-rss-with-ebpf-and-cpumap, Red Hat Developer, May 2021, 10 pages.
Linux Foundation, "networking:sk_buff [Wiki]", https://wiki.linuxfoundation.org/networking/sk_buff, Jul. 2016, 2 pages.
Red Hat Enterprise Linux 6 Performance Tuning Guide, "8.8 Receive Flow Steering (RFS)", https://docs.redhat.com/en/documentation/red_hat_enterprise_linux/6/html/performance_tuning_guide/network-rfs, Nov. 2013, 2 pages.

* cited by examiner

PACKET PROCESSING CONFIGURATIONS

RELATED APPLICATION

This application claims priority to PCT/CN2022/120723, filed Sep. 23, 2022. The entire contents of that application are incorporated by reference in its entirety.

DESCRIPTION

Linux® socket type Address Family of the eXpress Data Path (AF_XDP) is built upon the Extended Berkeley Packet Filter (eBPF) and eXpress Data Path (XDP) technology. An AF_XDP socket receives and sends packets from an eBPF and XDP-based program in communication with a network device (netdev) and bypasses Linux® kernel subsystems. In other words, AF_XDP sockets can allow XDP programs to redirect frames to a memory buffer accessible to user-space applications. Instead of using a user space driver, user space applications can directly read or make changes to network packet data and can bypass processing of a packet by a kernel stack.

XDP provides a high performance, programmable network data path in the Linux® kernel. XDP is built on eBPF technology. An XDP hook point is accessible in an ingress path of a network interface and provides bare metal packet processing in the software stack. XDP allows redirecting packets from ingress of one interface to another interface egress. For example, a packet that a container sends out (egresses) can be modified by XDP and redirected to host network interface egress from container network interface ingress. A host network interface card (NIC) can transmit an XDP frame.

sk_buff is a kernel structure for a networking stack that includes pointers to different layers of packet headers and payload data in queues and buffers in the kernel. sk_buff can include meta data about a packet (e.g., Internet Protocol (IP) destination address, Transmission Control Protocol (TCP) address, and so forth). By contrast, an xdp_buff structure can include pointers to packet data start and data end to refer to an XDP frame (e.g., a type of raw frame) but not reference fields that indicate where to transmit a packet associated with the XDP frame. For example, an XDP frame may not identify an IP destination address or a TCP port for the packet associated with the XDP frame.

Linux® Receive Flow Steering (RFS) is a technology to steer incoming network packets to a processor core that executes a target process, container, or virtual machine (VM). RFS offloading to a network interface card (NIC) can maintain a relationship between flows and cores in a hash table on the NIC. A host system can provide an RFS descriptor to the NIC to control how NIC populates the hash table with mappings to indicate which TCP port transmits packets from which queue. A NIC driver can construct the RFS descriptor based on accessing an sk_buff.

DETAILED DESCRIPTION

When an outgoing packet is an XDP raw packet, metadata may not be available to associate a flow of the packet with a particular process or processor. RFS technology of a NIC may not have a populated entry in a flow-to-core table. Administrators can manually add rule entry to the table on the NIC to specify what traffic is to be directed to a particular core for processing, but such approach may lack flexibility of addressing scenarios where processes are migrated to different cores.

At least to provide for configuring a NIC to direct received packets of a flow or tunnel to a processor when outgoing packets of the flow or tunnel are raw packets with no transmission context (e.g., XDP frames). A NIC driver can form a packet transmit (TX) descriptor to indicate to a TX parser of the NIC to identify particular portions of the packet to associate with a particular processor and include an entry in a table mapping such portions of the packet to the particular processor. Accordingly, RFS offloaded operations can be performed by the NIC based on raw frame data. The NIC hardware can automatically populate an RFS hash table without system software parsing the packet or a NIC driver being created to construct a programming descriptor that populates the RFS hash table with a mapping of flow-to-core. Instead, the NIC driver can form a descriptor with flags to cause TX packet parsing to identify fields for a flow-to-core entry, including the entry in a flow-to-core steering table, and RFS operations are offloaded to a NIC. Although examples, are described with respect to cores, flows can be mapped to other devices such as graphics processing units, accelerators, memory, storage, or other circuitry.

Figure 1:
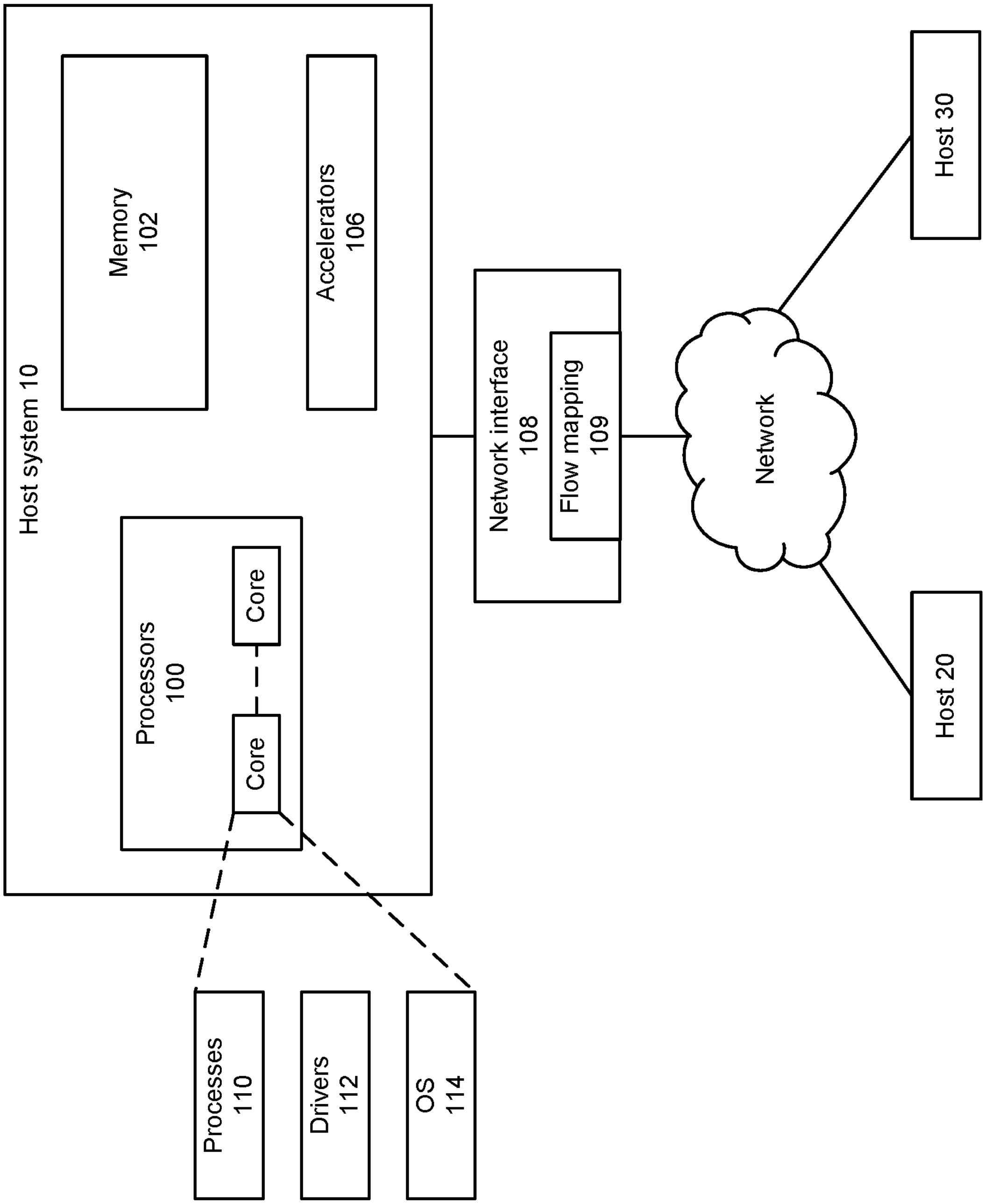
FIG. 1 depicts an example system.

FIG. 1 depicts an example system. Host system 10 can include processors 100 that execute one or more of processes 110, operating system (OS) 114, and device driver 116. Various examples of hardware and software utilized by the host system are described at least with respect to FIG. 8 or 9. For example, processors 100 can include a CPU, graphics processing unit (GPU), accelerator, or other processors described herein. Processes 110 can include one or more of: application, process, thread, a virtual machine (VM), microVM, container, microservice, or other virtualized execution environment.

Various examples of processes 110 can perform packet processing based on one or more of Data Plane Development Kit (DPDK), Storage Performance Development Kit (SPDK), OpenDataPlane, Network Function Virtualization (NFV), software-defined networking (SDN), Evolved Packet Core (EPC), or 5G network slicing. Some example implementations of NFV are described in ETSI specifications or Open Source NFV MANO from ETSI's Open Source Mano (OSM) group. Processes 110 can include virtual network function (VNF), such as a service chain or sequence of virtualized tasks executed on generic configurable hardware such as firewalls, domain name system (DNS), caching or network address translation (NAT) and can run in virtual execution environments. VNFs can be linked together as a service chain. Processes 110 can include a cloud native network function (CNF), which can include a network function that executes inside a container. In some examples, EPC is a 3GPP-specified core architecture at least for Long Term Evolution (LTE) access. 5G network slicing can provide for multiplexing of virtualized and independent logical networks on the same physical network infrastructure. Some processes 110 can perform video processing or media transcoding (e.g., changing the encoding of audio, image or video files).

A virtualized execution environment (VEE) can include at least a virtual machine or a container. A virtual machine (VM) can be software that runs an operating system and one or more applications. A VM can be defined by specification, configuration files, virtual disk file, non-volatile random access memory (NVRAM) setting file, and the log file and is backed by the physical resources of a host computing platform. A VM can include an operating system (OS) or application environment that is installed on software, which imitates dedicated hardware. The end user has the same experience on a virtual machine as they would have on dedicated hardware. Specialized software, called a hypervisor, emulates the PC client or server's CPU, memory, hard disk, network, and other hardware resources completely, enabling virtual machines to share the resources. The hypervisor can emulate multiple virtual hardware platforms that are isolated from another, allowing virtual machines to run Linux®, Windows® Server, VMware ESXi, and other operating systems on the same underlying physical host.

A container can be a software package of applications, configurations and dependencies so the applications run reliably on one computing environment to another. Containers can share an operating system installed on the server platform and run as isolated processes. A container can be a software package that contains everything the software needs to run such as system tools, libraries, and settings. Containers may be isolated from the other software and the operating system itself. The isolated nature of containers provides several benefits. First, the software in a container will run the same in different environments. For example, a container that includes PHP and MySQL can run identically on both a Linux® computer and a Windows® machine. Second, containers provide added security since the software will not affect the host operating system. While an installed application may alter system settings and modify resources, such as the Windows registry, a container can only modify settings within the container.

Processes 110 can include a Cloud-Native Network Function (CNF), which can include a software-implementation of a network function, which runs inside Linux containers and can be orchestrated by Kubernetes. CNFs can include containerized microservices that communicate with each other via standardized RESTful application program interfaces (APIs). In European Telecommunications Standards Institute (ETSI) NFV standards, Cloud-Native Network Functions are a particular type of Virtualized Network Functions and can be orchestrated as VNFs using the ETSI NFV MANO architecture and technology-agnostic descriptors (e.g., TOSCA, YANG).

Drivers 112 can provide processes 110 or operating system (OS) 114 with utilization of accelerators 106, network interface 108, or other devices. As described herein, NIC driver 112 can cause network interface 108 to generate an entry in flow mapping 109 to identify one or more cores to process packets of a flow. For example, NIC driver 112 can generate a descriptor to cause a parser or other circuitry of network interface 108 to identify one or more header fields of a packet that is to be transmitted, at a request of process 110, as well as depth of packet inspection in the entry. For example, where a packet buffer is or includes an XDP buffer, pointers to the packet in the buffer may refer to packet start and packet end but not indicate start of a header field. Instead, NIC driver 112 can generate a descriptor for the packet that indicates start locations of one or more header fields. Network interface 108 can utilize the entry to identify a core to process a received packet based on specified depth of packet inspection and one or more fields of the received packet.

Network interface 108 can receive packets directed to one or more of processes 110 and transmit packets at the request of processes 110. Network interface 108 can refer to one or more of the following examples: a data processing unit (DPU), infrastructure processing unit (IPU), smartNIC, forwarding element, router, switch, network interface controller, network-attached appliance (e.g., storage, memory, accelerator, processors, security), and so forth. Some examples of network interface 108 are described with respect to systems of FIGS. 7, 8, and/or 9.

Network interface 108 can utilize one or more transmit queues and receive queues. One or more transmit and receive queues can be trigger a particular interrupt to a processor. Interrupt Request (IRQ) affinity can be set to cause a change to a transmit or receive queue to cause an interrupt to a specific core. For example, a queue identifier (ID) can correspond to a core ID. As described herein network interface 108 can include circuitry to parse transmitted packets.

Figure 2:
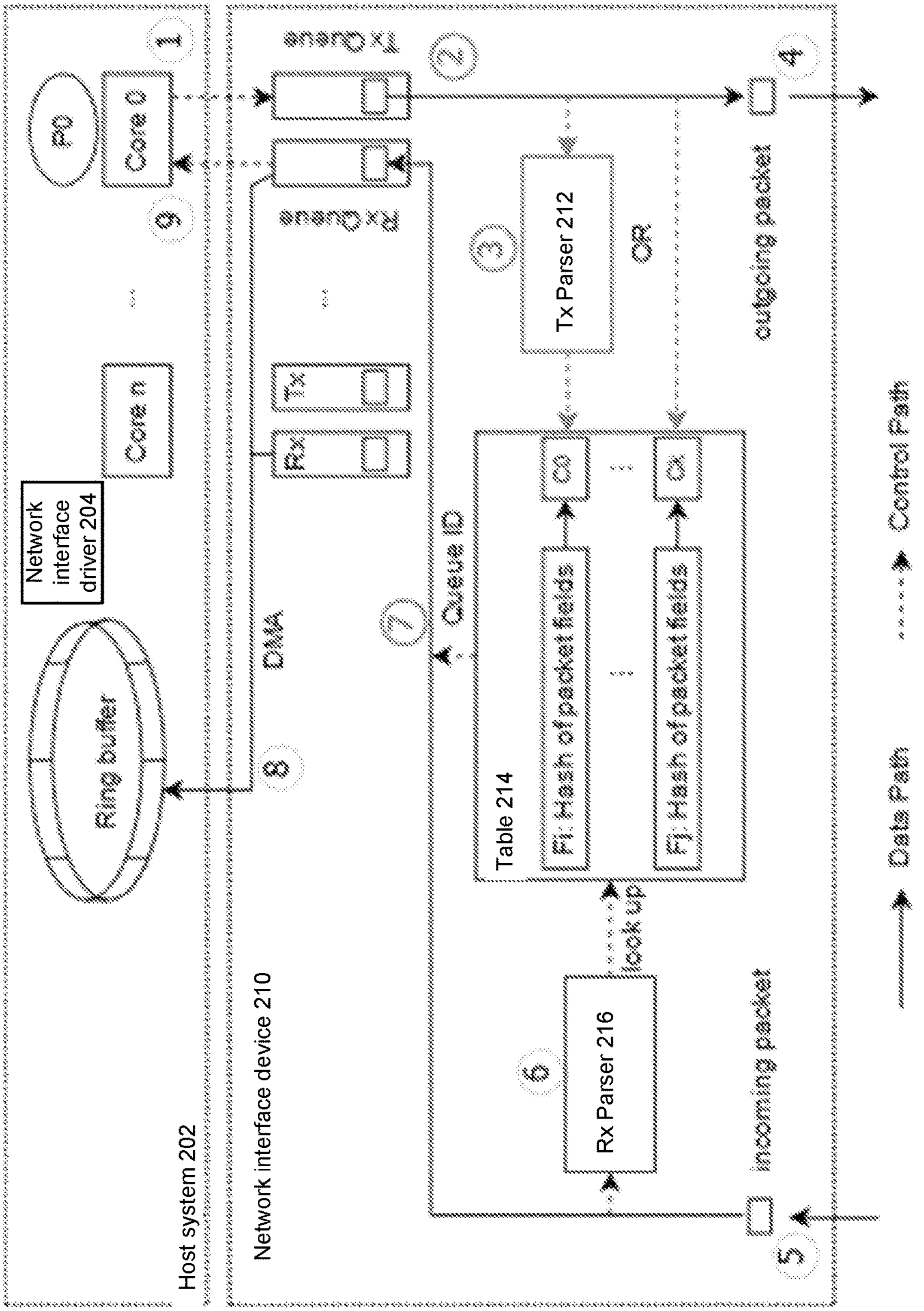
FIG. 2 depicts an example of operations.

FIG. 2 depicts an example of operations. For a packet to be transmitted by network interface device 210, operations (1) to (4) can take place whereas for a received packet by network interface device 210 from another network interface device, operations (5) to (9) can take place. At (1), packet to be transmitted can be generated on a specific core (core 0) at the request of a process P0 can assigned to a transmit (Tx) queue. Various examples of processes can include virtual machines, containers, applications, and others. The packet to be transmitted can be placed in a Tx queue that associated with core 0.

At (2), the packet to be transmitted includes a structured frame (e.g., Linux SKB), network interface card (NIC) driver 204 can access fields from the packet and populate table 214 via a programmable interface (e.g., descriptor) provided by network interface device 210. For example, driver 204 can execute on a core or other processor.

An example of an XDP frame buffer is described in the following link: https://elixir.bottlin.com/linux/latest/source/include/net/xdp.h#L77. For example, "xdp→data_hard_start=hard_start" can indicate a start of a raw frame in the buffer and "xdp→data_end=data+data_len" can indicate an end of the raw frame in the buffer, but a location of a header may not be identified. For a packet that is or includes a raw frame (e.g., XDP frame) and/or is stored in an XDP frame buffer, driver 204 can construct a descriptor which indicates network interface device 210 is to perform parsing of the packet prior to transmission, populate table 214 with an entry mapping a flow to a core (e.g., core 0), and transmit the Tx packet. In some examples, driver 204 can construct the descriptor to indicate locations of one or more headers of the raw frame and can request populating table 214 with a flow-to-core mapping. Driver 204 can place the descriptor in the TxQueue. Based on the descriptor, network interface device 210 can parse the packet (e.g., raw frame) and populate table 214 based on the descriptor. The descriptor can specify a depth that parser 216 is to process a packet to obtain an inner source address (SA) or destination address (DA).

A flow can be a sequence of packets being transferred between two endpoints, generally representing a single session using a known protocol. Accordingly, a flow can be identified by a set of defined tuples and, for routing purpose, a flow is identified by the two tuples that identify the endpoints, e.g., the source and destination addresses. For content-based services (e.g., load balancer, firewall, intrusion detection system, etc.), flows can be differentiated at a finer granularity by using N-tuples (e.g., source address, destination address, IP protocol, transport layer source port, and destination port). A packet in a flow is expected to have the same set of tuples in the packet header. A packet flow to be controlled can be identified by a combination of tuples (e.g., Ethernet type field, source and/or destination IP address, source and/or destination User Datagram Protocol (UDP) ports, source/destination TCP ports, or any other header field) and a unique source and destination queue pair (QP) number or identifier. A packet may be used herein to refer to various formatted collections of bits that may be sent across a network, such as Ethernet frames, IP packets, TCP segments, UDP datagrams, etc. Also, as used in this document, references to L2, L3, L4, and L7 layers (layer 2, layer 3, layer 4, and layer 7) are references respectively to the second data link layer, the third network layer, the fourth transport layer, and the seventh application layer of the OSI (Open System Interconnection) layer model.

Reference to a flow can instead or in addition refer to a tunnel (e.g., Multiprotocol Label Switching (MPLS) Label Distribution Protocol (LDP), Segment Routing over IPv6 dataplane (SRv6) source routing, VXLAN tunneled traffic, GENEVE tunneled traffic, virtual local area network (VLAN)-based network slices, technologies described in Mudigonda, Jayaram, et al., “Spain: Cots data-center ethernet for multipathing over arbitrary topologies,” NSDI. Vol. 10. 2010 (hereafter “SPAIN”), and so forth.

Figure 3:
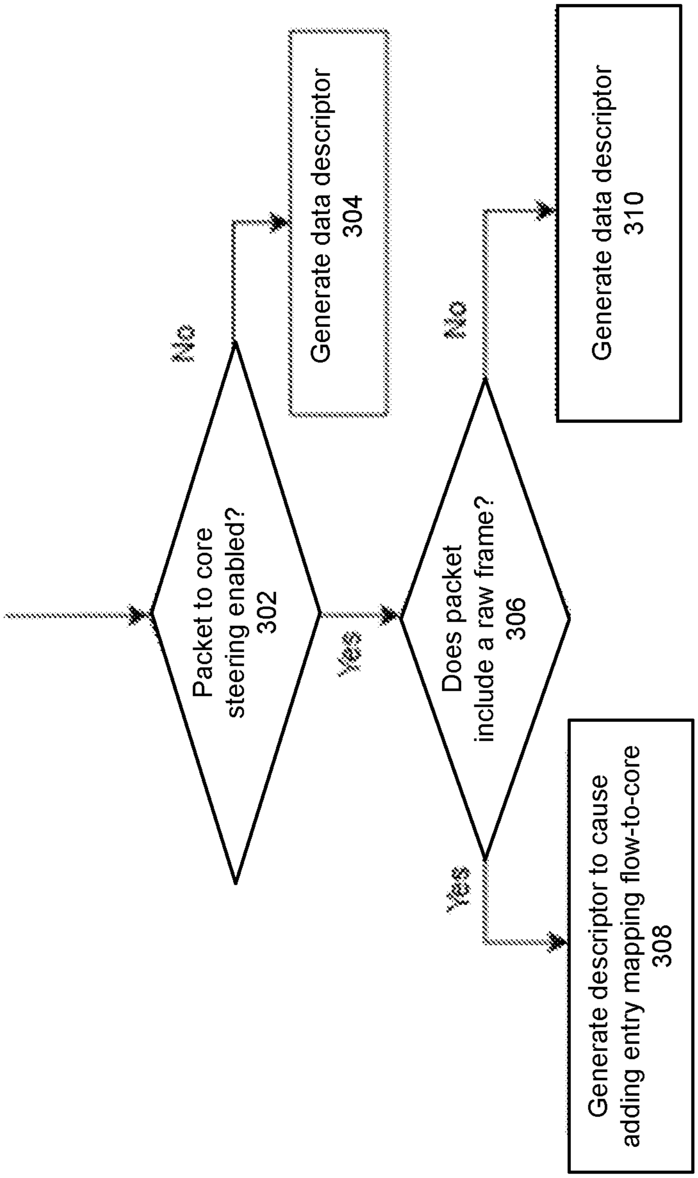
FIG. 3 depicts an example process to generate descriptors for a packet to be transmitted based on format of the packet.

FIG. 3 depicts an example process to generate descriptors for a packet to be transmitted based on a format of the packet. The process can be performed by a driver of a network interface device or operating system, in some examples. At 302, a determination can be made as to whether a packet-to-core steering mode is enabled in a network interface device. Based on packet-to-core steering mode not being enabled, the process can proceed to 304. Based on packet-to-core steering mode being enabled, the process can proceed to 306.

At 304, a descriptor can be generated for the packet. For example, the descriptor can indicate a starting memory address, length, and one or more flow identifying data. An example format of the descriptor is transmit data descriptor 402 of FIG. 4, although other examples can be used.

At 306, a determination can be made as to whether the packet includes a raw frame. For example, if the format of the packet is an XDP frame or other format, the packet includes a raw frame and the process proceeds to 308. Other raw frame formats include Linux® AF UNIX. For example, if the packet does not include a raw frame and/or is provided in an sk_buff or other format, the process can proceed to 310.

At 308, a descriptor can be generated that includes indicators, that when processed by a parser or other circuitry of the network interface device, cause the parser or other circuitry to parse one or more headers of an associated packet, copy one or more fields of the packet, and include an entry in a flow-to-core table to map a flow of the packet to a core. An example format of the descriptor is data descriptor 406 of FIG. 4, although other examples can be used.

At 310, a descriptor can be generated that includes packet type and programming type. An example format of the descriptor is data descriptor 404 of FIG. 4, although other examples can be used. Descriptor of format 404 can be used to avoid duplicate packet parsing for a structured frame.

Figure 4:
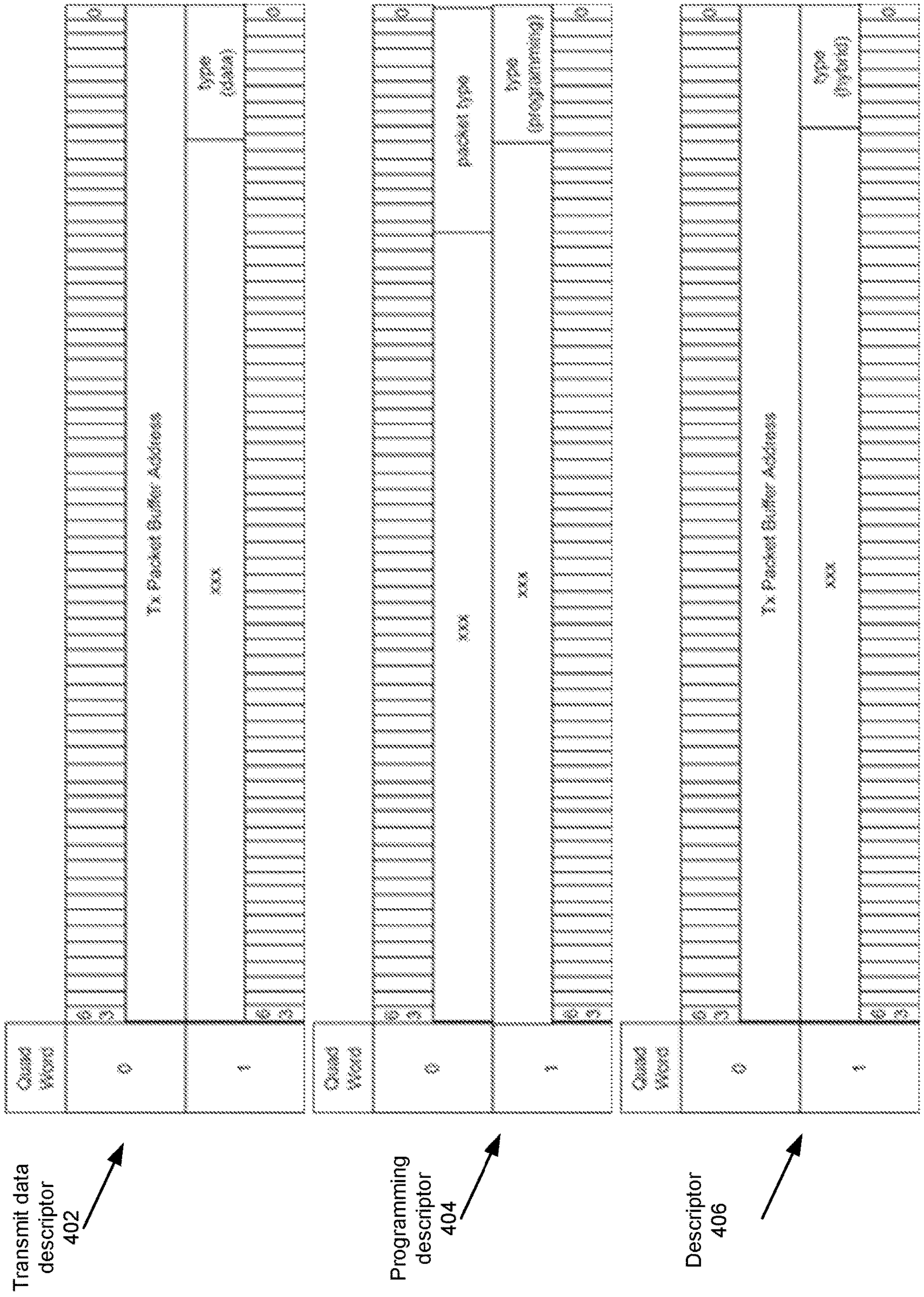
FIG. 4 depicts examples of different descriptors that can be generated by a driver to request processing of a packet prior to transmission.

FIG. 4 depicts examples of different descriptors that can be generated by a driver to request processing of a packet prior to transmission. Transmit data descriptor 402 can be used to transmit a packet where RFS offload is not performed at the network interface device. Descriptor 404 can be used for populating an RFS hash table (e.g., table 214) utilized by a network interface device based on fields of sk_buff, such as a destination IP address or destination TCP address. Descriptor 406 can be used to indicate information in descriptor 406 is to be used for packet parsing, hash table population, and packet transmission.

Referring again to FIG. 2, at (3), TX parser 212 can process descriptors associated with the packet to be transmitted. Based on a flag in the descriptor, Tx parser 212 can parse the one or more headers of the packet, copy particular fields of the packet, and populate an entry to be added to table 214 with a mapping of flow-to-core automatically. Driver 204 can utilize a TX packet and its descriptor to update table 214 to perform flow-to-queue association for received packets of the flow. Fields used can depend on factors such as source IP address, destination IP address, packet type, etc. For example, for a TCP or UDP packet, 5-tuple (e.g., src_ip, dst_ip, src_port, dst_port, protocol) can be used to specify a flow. For example, for an outgoing packet generated on core 0 with a header, parser 212 can parser the header of the packet and determine a flow to be identified by {src_ip: x, dst_ip: y, src_port: p, dst_port: q, protocol: TCP}. Parser 212 can generate flow identifier entry and write the entry to table 214 to indicate flow to be processed by core 0, namely {src_ip: y, dst_ip: x, src_port: q, dst_port: p, protocol: TCP}. At (4), before, during, or after hash table is populated, the packet can be transmitted.

Note that in some examples, a process P0 is pinned to a core, IRQ is specified for the core, RX queue ID, and TX queue ID do not change. However, based on migration of the process to another device or platform, the mapping of flow-to-core can be updated to identify the core that executes the process.

Figure 5:
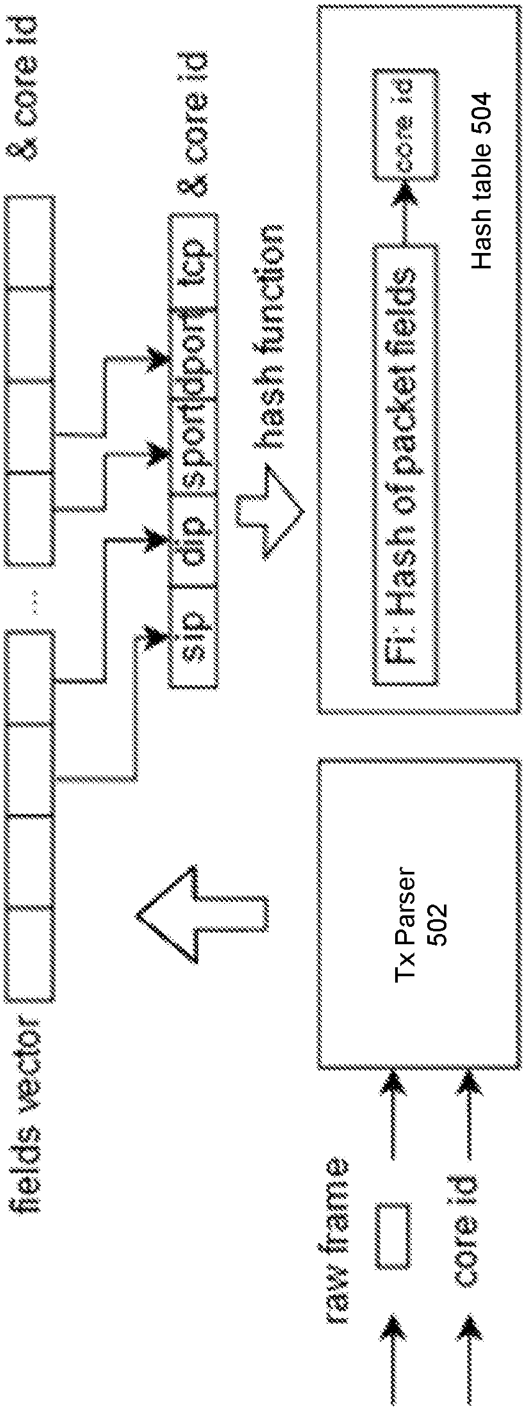
FIG. 5 shows examples of input and output of a TX parser and interaction with a hash table.

FIG. 5 shows examples of input and output of a TX parser and interaction with a hash table. TX parser 502 can be configured with depth to parse a header of a packet to be transmitted and how many fields of the header to parse. For example, if the traffic is VXLAN/GENEVE tunneled or transmitted using Internet Protocol Security (IPsec), parser 502 can access Security Association (SA) and/or DirectAccess (DA) information of a received packet. Based on the packet descriptor triggering an addition of an entry to table 504, TX parser 502 can utilize circuitry to populate flow-to-core mapping hash table 504 after parsing the packet.

Description next turns to examples of directing received packets for processing based on previously received configurations. Referring again to FIG. 2, at (5), the incoming packet in FIG. 2 can be a response to the transmitted packet generated by core 0. At (6), RX parser 216 parses headers of the received packet to determine values of one or more fields of the received packet. At (7), after the packet is parsed, Rx parser 216 can access hash table 214 to select a destination core (e.g., one or more of cores 0 to n). If a transmitted packet is a raw frame, without TX parser 212, table 214 may not have an entry to direct the received packet to a queue and associated core for a process and network interface device 210 can copy the received packet to a default receive queue. As TX parser 212 provides an entry in table 214 populated by (2) and (3), a destination of core 0 can be identified during or prior to receipt of the packet, an IRQ affinity can be set to direct the packet to a specific receive queue associated with the core 0.

At (8), network interface device 210 can copy (e.g., direct memory access (DMA)) the received packet to the corresponding ring buffer in host system memory associated with its receive queue. At (9), network interface device 210 can issue a hardware interrupt to the core associated with the receive queue (e.g., core 0). Core 0 responds to an interrupt and processes the received packet by a network stack, and the packet is copied to user space and processed by P0.

Figure 6:
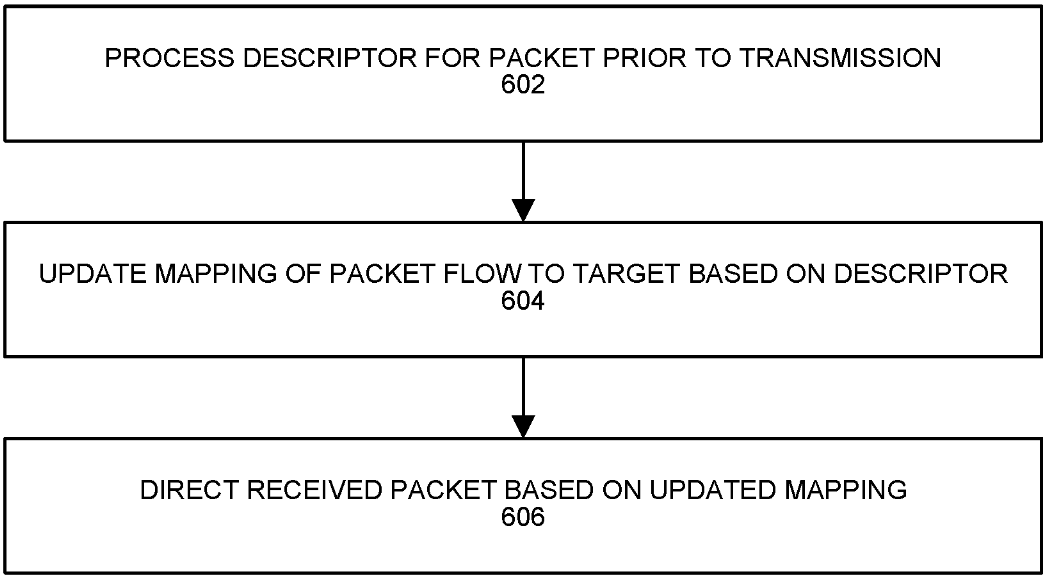
FIG. 6 depicts an example process.

FIG. 6 depicts an example process. The process can be performed by a network interface device. At 602, the network interface device can process a descriptor associated with packet to be transmitted. At 604, the network interface device can form and add an entry into a mapping for received packets based on the descriptor indicating to parse the packet and form and add an entry into a mapping for received packets. For example, the descriptor can specify one or more fields of a packet to associated with a particular core, processor, or device and a depth of received packet (e.g., from start of packet to location of field to process). For example, depth can refer to length from start of VXLAN packet to inner IP header. In some examples, the packet to be transmitted can include a raw frame, such as an XDP frame. At 606, based on receipt of a packet, the network interface device can process the packet based on the entry and cause the received packet to be provided to a queue associated with the particular core, processor, or device specified by the entry.

Figure 7:
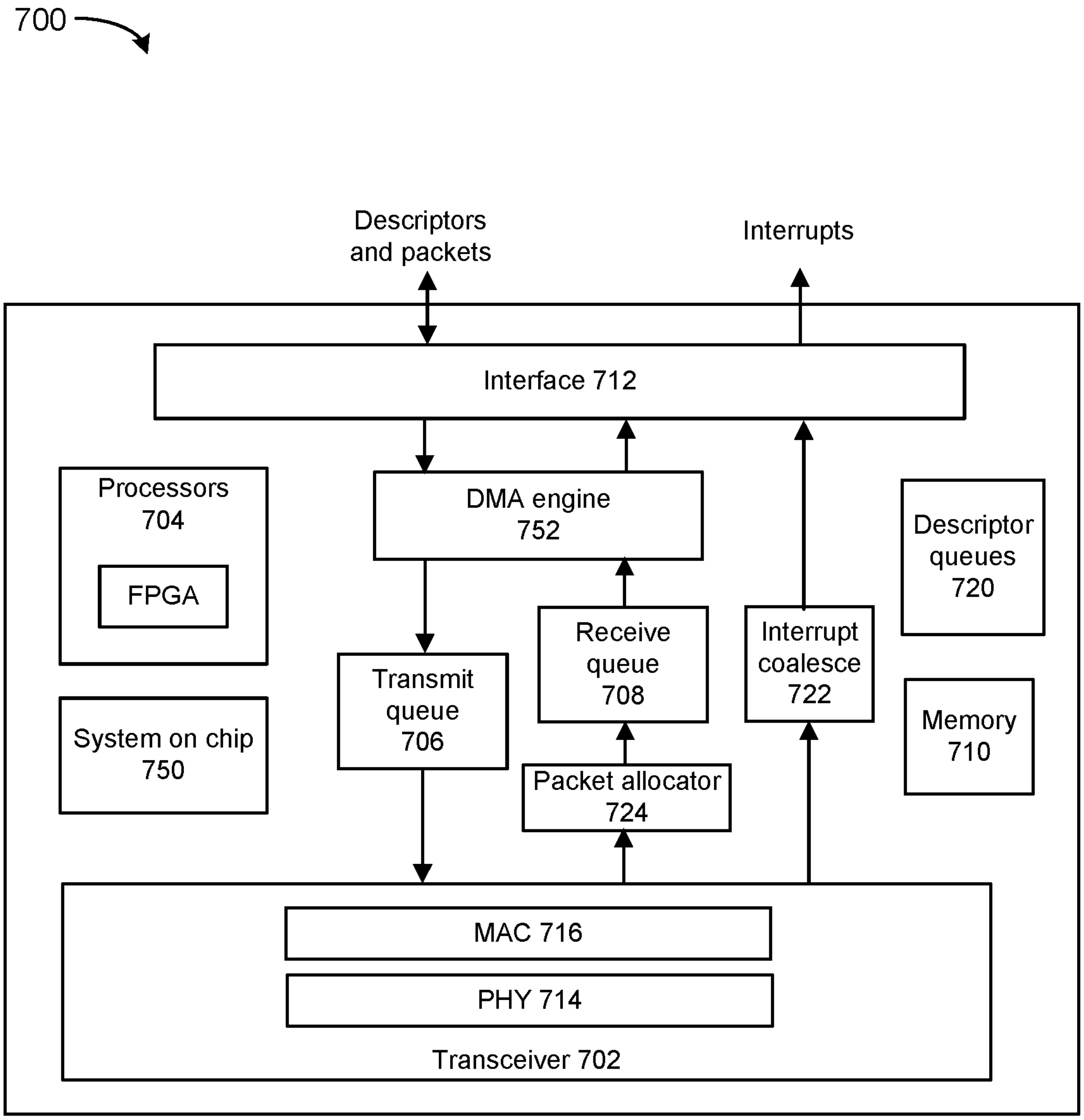
FIG. 7 depicts an example network interface.

FIG. 7 depicts an example network interface or packet processing device. In some examples, mappings of received packets to target processes or devices can be updated, as described herein. In some examples, packet processing device 700 can be implemented as a network interface controller, network interface card, a host fabric interface (HFI), or host bus adapter (HBA), and such examples can be interchangeable. Packet processing device 700 can be coupled to one or more servers using a bus, PCIe, CXL, or DDR. Packet processing device 700 may be embodied as part of a system-on-a-chip (SoC) that includes one or more processors, or included on a multichip package that also contains one or more processors.

Some examples of packet processing device 700 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

Network interface 700 can include transceiver 702, processors 704, transmit queue 706, receive queue 708, memory 710, and bus interface 712, and DMA engine 752. Transceiver 702 can be capable of receiving and transmitting packets in conformance with the applicable protocols such as Ethernet as described in IEEE 802.3, although other protocols may be used. Transceiver 702 can receive and transmit packets from and to a network via a network medium (not depicted). Transceiver 702 can include PHY circuitry 714 and media access control (MAC) circuitry 716. PHY circuitry 714 can include encoding and decoding circuitry (not shown) to encode and decode data packets according to applicable physical layer specifications or standards. MAC circuitry 716 can be configured to assemble data to be transmitted into packets, that include destination and source addresses along with network control information and error detection hash values.

Processors 704 can be any a combination of a: processor, core, graphics processing unit (GPU), field programmable gate array (FPGA), application specific integrated circuit (ASIC), or other programmable hardware device that allow programming of network interface 700. For example, a "smart network interface" can provide packet processing capabilities in the network interface using processors 704.

Processors 704 can include one or more packet processing pipeline that can be configured to perform match-action on received packets to identify packet processing rules and next hops using information stored in a ternary content-addressable memory (TCAM) tables or exact match tables in some embodiments. For example, match-action tables or circuitry can be used whereby a hash of a portion of a packet is used as an index to find an entry. Packet processing pipelines can perform one or more of: packet parsing (parser or packet content reading), exact match-action (e.g., small exact match (SEM) engine or a large exact match (LEM)), wildcard match-action (WCM), longest prefix match block (LPM), a hash block (e.g., receive side scaling (RSS)), a packet modifier (modifier), or traffic manager (e.g., transmit rate metering or shaping).

Configuration of operation of processors 704, including its data plane, can be programmed based on one or more of: Protocol-independent Packet Processors (P4), Software for Open Networking in the Cloud (SONiC), Broadcom® Network Programming Language (NPL), NVIDIA® CUDA®, NVIDIA® DOCA™, Infrastructure Programmer Development Kit (IPDK), Data Plane Development Kit (DPDK), OpenDataPlane, among others. Processors 704 and/or system on chip 750 can execute instructions or perform operations to update mappings of received packets to target processes or devices can be updated, as described herein.

Packet allocator 724 can provide distribution of received packets for processing by multiple CPUs or cores using timeslot allocation described herein or RSS. When packet allocator 724 uses RSS, packet allocator 724 can calculate a hash or make another determination based on contents of a received packet to determine which CPU or core is to process a packet. In some examples, packet allocator 724 can execute instructions or perform operations to direct packets to target processes or devices based on mappings, as described herein Interrupt coalesce 722 can perform interrupt moderation whereby network interface interrupt coalesce 722 waits for multiple packets to arrive, or for a time-out to expire, before generating an interrupt to host system to process received packet(s). Receive Segment Coalescing (RSC) can be performed by network interface 700 whereby portions of incoming packets are combined into segments of a packet. Network interface 700 provides this coalesced packet to an application.

Direct memory access (DMA) engine 752 can copy a packet header, packet payload, and/or descriptor directly from host memory to the network interface or vice versa, instead of copying the packet to an intermediate buffer at the host and then using another copy operation from the intermediate buffer to the destination buffer.

Memory 710 can be any type of volatile or non-volatile memory device and can store any queue or instructions used to program network interface 700. Transmit queue 706 can include data or references to data for transmission by network interface. Receive queue 708 can include data or references to data that was received by network interface from a network. Descriptor queues 720 can include descriptors that reference data or packets in transmit queue 706 or receive queue 708. Bus interface 712 can provide an interface with host device (not depicted). For example, bus interface 712 can be compatible with PCI, PCI Express, PCI-x, Serial ATA, and/or USB compatible interface (although other interconnection standards may be used).

Figure 8:
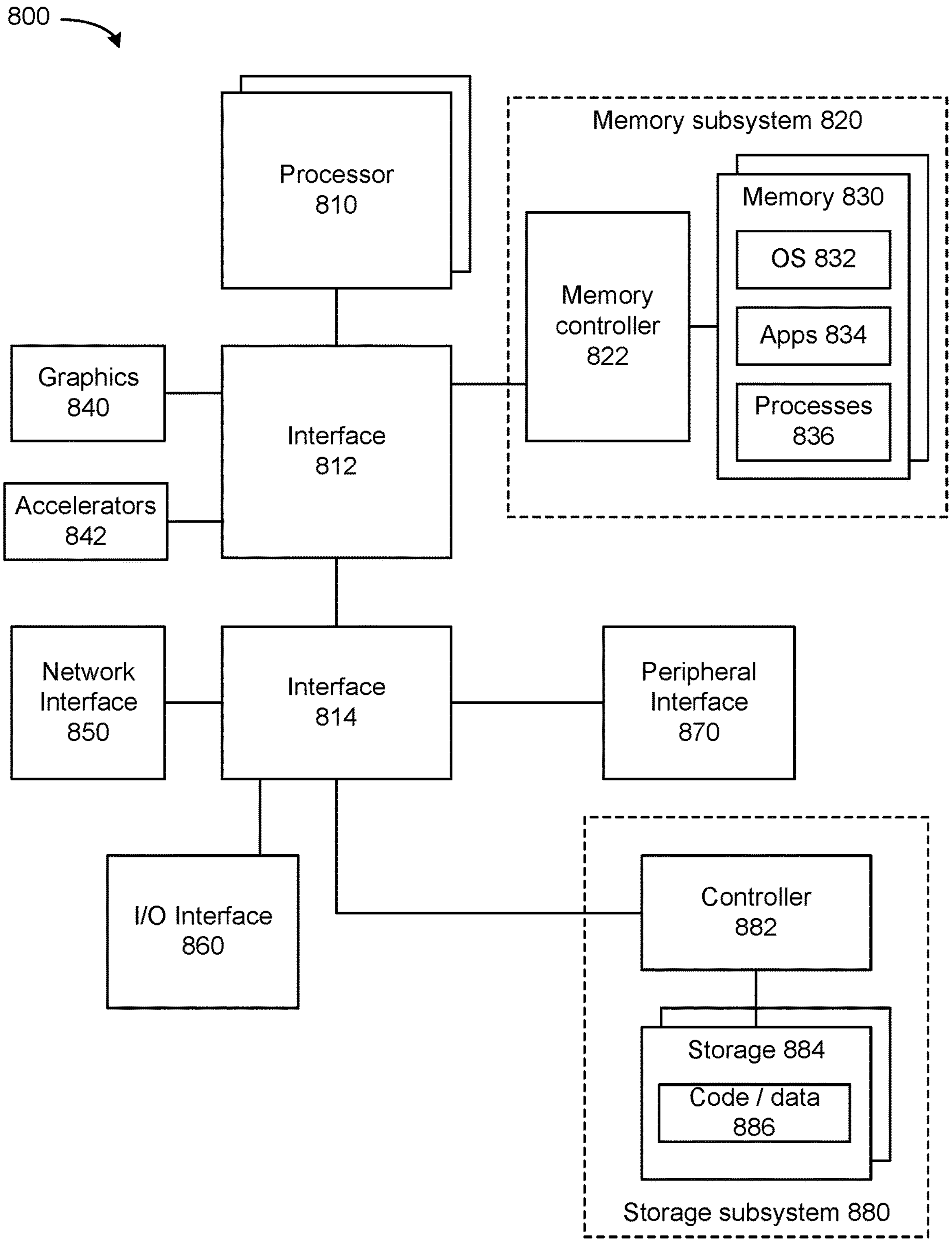
FIG. 8 depicts an example computing system.

FIG. 8 depicts an example computing system that can be used in a server or data center. Components of system 800 (e.g., processor 810, accelerators 842, and so forth) to perform operations to update mappings of received packets to target processes or devices can be updated, as described herein. System 800 includes processor 810, which provides processing, operation management, and execution of instructions for system 800. Processor 810 can include any type of microprocessor, central processing unit (CPU), graphics processing unit (GPU), processing core, or other processing hardware to provide processing for system 800, or a combination of processors. Processor 810 controls the overall operation of system 800, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 800 includes interface 812 coupled to processor 810, which can represent a higher speed interface or a high throughput interface for system components that needs higher bandwidth connections, such as memory subsystem 820 or graphics interface components 840, or accelerators 842. Interface 812 represents an interface circuit, which can be a standalone component or integrated onto a processor die. Where present, graphics interface 840 interfaces to graphics components for providing a visual display to a user of system 800. In one example, graphics interface 840 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 840 generates a display based on data stored in memory 830 or based on operations executed by processor 810 or both. In one example, graphics interface 840 generates a display based on data stored in memory 830 or based on operations executed by processor 810 or both.

Accelerators 842 can be a fixed function or programmable offload engine that can be accessed or used by a processor 810. For example, an accelerator among accelerators 842 can provide compression (DC) capability, cryptography services such as public key encryption (PKE), cipher, hash/authentication capabilities, decryption, or other capabilities or services. In some embodiments, in addition or alternatively, an accelerator among accelerators 842 provides field select controller capabilities as described herein. In some cases, accelerators 842 can be integrated into a CPU socket (e.g., a connector to a motherboard or circuit board that includes a CPU and provides an electrical interface with the CPU). For example, accelerators 842 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs) or programmable logic devices (PLDs). Accelerators 842 can provide multiple neural networks, CPUs, processor cores, general purpose graphics processing units, or graphics processing units can be made available for use by artificial intelligence (AI) or machine learning (ML) models. For example, the AI model can use or include one or more of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 820 represents the main memory of system 800 and provides storage for code to be executed by processor 810, or data values to be used in executing a routine. Memory subsystem 820 can include one or more memory devices 830 such as read-only memory (ROM), flash memory, one or more varieties of random access memory (RAM) such as DRAM, or other memory devices, or a combination of such devices. Memory 830 stores and hosts, among other things, operating system (OS) 832 to provide a software platform for execution of instructions in system 800. Additionally, applications 834 can execute on the software platform of OS 832 from memory 830. Applications 834 represent programs that have their own operational logic to perform execution of one or more functions. Processes 836 represent agents or routines that provide auxiliary functions to OS 832 or one or more applications 834 or a combination. OS 832, applications 834, and processes 836 provide software logic to provide functions for system 800. In one example, memory subsystem 820 includes memory controller 822, which is a memory controller to generate and issue commands to memory 830. It will be understood that memory controller 822 could be a physical part of processor 810 or a physical part of interface 812. For example, memory controller 822 can be an integrated memory controller, integrated onto a circuit with processor 810.

In some examples, OS 832 can be Linux®, Windows® Server or personal computer, FreeBSD®, Android®, MacOS®, iOS®, VMware vSphere, openSUSE, RHEL, CentOS, Debian, Ubuntu, or any other operating system. The OS and driver can execute on a CPU sold or designed by Intel®, ARM®, AMD®, Qualcomm®, IBM®, Texas Instruments®, among others.

In some examples, OS 832 can enable or disable network interface 850 to perform operations to update mappings of received packets to target processes or devices can be updated, as described herein While not specifically illustrated, it will be understood that system 800 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 800 includes interface 814, which can be coupled to interface 812. In one example, interface 814 represents an interface circuit, which can include standalone components and integrated circuitry. In one example, multiple user interface components or peripheral components, or both, couple to interface 814. Network interface 850 provides system 800 the ability to communicate with remote devices (e.g., servers or other computing devices) over one or more networks. Network interface 850 can include an Ethernet adapter, wireless interconnection components, cellular network interconnection components, USB (universal serial bus), or other wired or wireless standards-based or proprietary interfaces. Network interface 850 can transmit data to a device that is in the same data center or rack or a remote device, which can include sending data stored in memory. Network interface 850 can perform operations to update mappings of received packets to target processes or devices can be updated, as described herein.

Some examples of network interface 850 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable pipelines or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

In one example, system 800 includes one or more input/output (I/O) interface(s) 860. I/O interface 860 can include one or more interface components through which a user interacts with system 800 (e.g., audio, alphanumeric, tactile/touch, or other interfacing). Peripheral interface 870 can include any hardware interface not specifically mentioned above. Peripherals refer generally to devices that connect dependently to system 800. A dependent connection is one where system 800 provides the software platform or hardware platform or both on which operation executes, and with which a user interacts.

In one example, system 800 includes storage subsystem 880 to store data in a nonvolatile manner. In one example, in certain system implementations, at least certain components of storage 880 can overlap with components of memory subsystem 820. Storage subsystem 880 includes storage device(s) 884, which can be or include any conventional medium for storing large amounts of data in a nonvolatile manner, such as one or more magnetic, solid state, or optical based disks, or a combination. Storage 884 holds code or instructions and data 886 in a persistent state (e.g., the value is retained despite interruption of power to system 800). Storage 884 can be generically considered to be a "memory," although memory 830 is typically the executing or operating memory to provide instructions to processor 810. Whereas storage 884 is nonvolatile, memory 830 can include volatile memory (e.g., the value or state of the data is indeterminate if power is interrupted to system 800). In one example, storage subsystem 880 includes controller 882 to interface with storage 884. In one example controller 882 is a physical part of interface 814 or processor 810 or can include circuits or logic in both processor 810 and interface 814.

A volatile memory is memory whose state (and therefore the data stored in it) is indeterminate if power is interrupted to the device. An example of a volatile memory include a cache. A non-volatile memory (NVM) device is a memory whose state is determinate even if power is interrupted to the device.

A power source (not depicted) provides power to the components of system 800. More specifically, power source typically interfaces to one or multiple power supplies in system 800 to provide power to the components of system 800. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 800 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), HyperTransport, high-speed fabric, NVLink, Advanced Microcontroller Bus Architecture (AMBA) interconnect, OpenCAPI, Gen-Z, Infinity Fabric (IF), Cache Coherent Interconnect for Accelerators (COX), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe.

Communications between devices can take place using a network, interconnect, or circuitry that provides chip-to-chip communications, die-to-die communications, packet-based communications, communications over a device interface, fabric-based communications, and so forth. A die-to-die communications can be consistent with Embedded Multi-Die Interconnect Bridge (EMIB).

Figure 9:
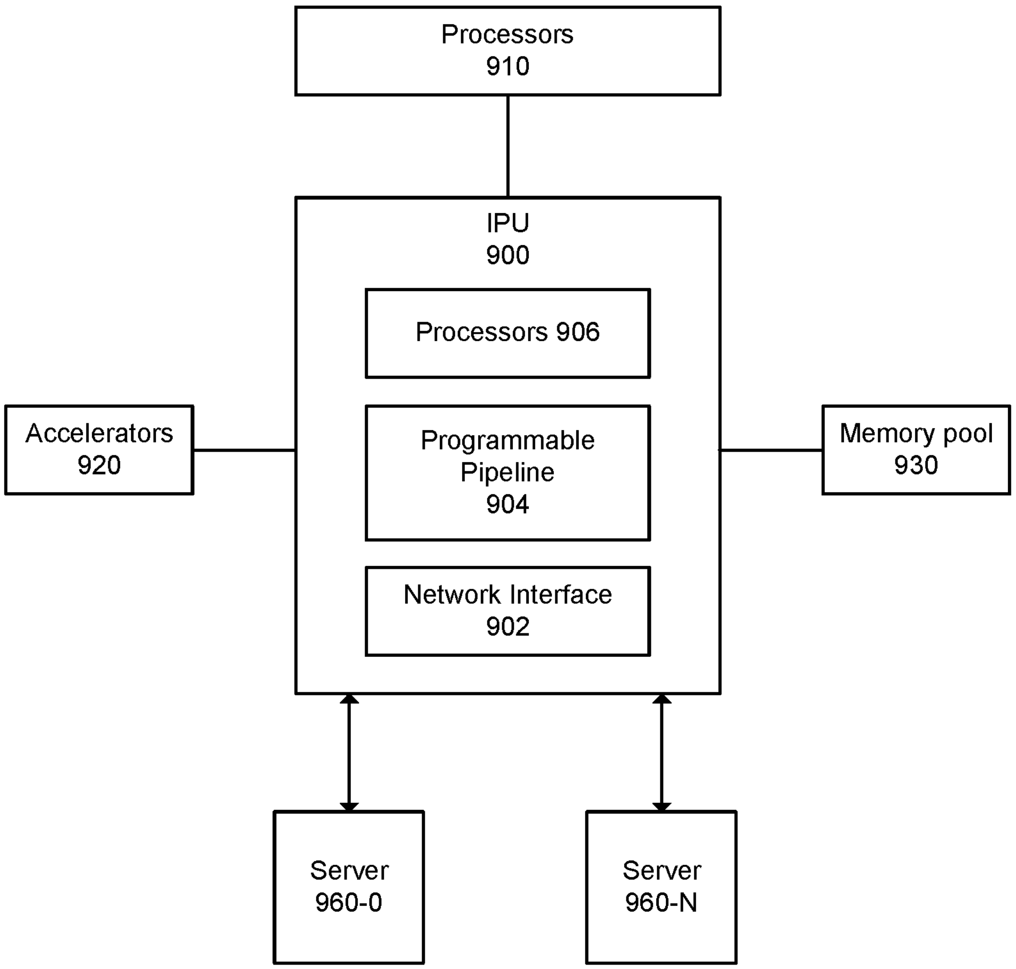
FIG. 9 depicts an example computing system.

FIG. 9 depicts an example system. In this system, IPU 900 manages performance of one or more processes using one or more of processors 906, processors 910, accelerators 920, memory pool 930, or servers 940-0 to 940-N, where N is an integer of 1 or more. In some examples, processors 906 of IPU 900 can execute one or more processes, applications, VMs, containers, microservices, and so forth that request performance of workloads by one or more of: processors 910, accelerators 920, memory pool 930, and/or servers 940-0 to 940-N. IPU 900 can utilize network interface 902 or one or more device interfaces to communicate with processors 910, accelerators 920, memory pool 930, and/or servers 940-0 to 940-N. IPU 900 can utilize programmable pipeline 904 to process packets that are to be transmitted from network interface 902 or packets received from network interface 902. Programmable pipeline 904 and/or processors 906 can be configured to perform operations to update mappings of received packets to target processes or devices can be updated, as described herein.

Examples herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, a blade can include components common to conventional servers, including a main printed circuit board (main board) providing internal wiring (e.g., buses) for coupling appropriate integrated circuits (ICs) and other components mounted to the board.

In some examples, network interface and other embodiments described herein can be used in connection with a base station (e.g., 3G, 4G, 5G and so forth), macro base station (e.g., 5G networks), picostation (e.g., an IEEE 802.11 compatible access point), nanostation (e.g., for Point-to-MultiPoint (PtMP) applications), micro data center, on-premise data centers, off-premise data centers, edge network elements, fog network elements, and/or hybrid data centers (e.g., data center that use virtualization, serverless computing systems (e.g., Amazon Web Services (AWS) Lambda), content delivery networks (CDN), cloud and software-defined networking to deliver application workloads across physical data centers and distributed multi-cloud environments).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data or instructions, including volatile memory or non-volatile memory, solid state storage, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or combination thereof, including "X, Y, and/or Z."

Illustrative examples of the devices, systems, and methods disclosed herein are provided below. An embodiment of the devices, systems, and methods may include one or more, and combination of, the examples described below.

Example 1 includes one or more examples and includes an apparatus comprising: an interface and a network interface device coupled to the interface and comprising circuitry to: receive packet data to be egressed, wherein the packet data does not specify a destination for the packet data and process the packet data to be egressed to generate a mapping of ingress packet-to-target based on a determination.

Example 2 includes one or more examples, wherein the determination comprises a type of packet data or content of a descriptor.

Example 3 includes one or more examples, wherein the determination comprises content of a descriptor and wherein the descriptor is to identify one or more fields of a the packet data that comprise content to include in the mapping.

Example 4 includes one or more examples, wherein the descriptor is to specify a depth of the received packet to process to determine the processor to process the received packet.

Example 5 includes one or more examples, wherein the packet data to be egressed comprises a Linux® eXpress Data Path (XDP) raw frame.

Example 6 includes one or more examples, wherein the circuitry comprises a packet parser to process the packet data to generate the mapping of received packet-to-target.

Example 7 includes one or more examples, wherein based on receipt of a packet, access the mapping to determine a processor to process the received packet and provide received packet to a queue associated with determined processor.

Example 8 includes one or more examples, wherein the network interface device comprises one or more of: a network interface controller (NIC), a remote direct memory access (RDMA)-enabled NIC, SmartNIC, router, switch, forwarding element, infrastructure processing unit (IPU), or data processing unit (DPU).

Example 9 includes one or more examples, and includes a server, wherein the server is to execute a driver to cause generation of the mapping.

Example 10 includes one or more examples, and includes a data center comprising the server and a second server, wherein the network interface is to transmit the packet to the second server and direct a packet received from the second server to a target process based on the mapping of received packet-to-target.

Example 11 includes one or more examples, and includes a non-transitory computer-readable medium comprising instructions stored thereon, that if executed by one or more processors, cause the one or more processors to: execute a driver to based on transmission of a frame without destination metadata, generate a descriptor to cause parsing of the frame to update an association of packets to one or more queues.

Example 12 includes one or more examples, wherein the packet data comprises a Linux® eXpress Data Path (XDP) raw frame.

Example 13 includes one or more examples, wherein the descriptor is to cause a packet parser to process the packet data based on the descriptor to generate the packets to one or more queues.

Example 14 includes one or more examples, wherein the descriptor is to identify one or more fields of a the packet data that comprise content to include in the association of packets to one or more queues.

Example 15 includes one or more examples, wherein the descriptor is to specify a depth of the received packet to process to determine the processor to process the received packet.

Example 16 includes one or more examples, and includes a method that includes: receiving packet data that does not specify a destination for the packet data; receiving a descriptor associated with the packet data; and processing the packet data based on the descriptor to generate a mapping of received packet-to-target.

Example 17 includes one or more examples, wherein the packet data comprises a Linux® eXpress Data Path (XDP) raw frame.

Example 18 includes one or more examples, wherein a packet parser performs the processing the packet data based on the descriptor to generate a mapping of received packet-to-target.

Example 19 includes one or more examples, wherein the descriptor is to identify one or more fields of a the packet data that comprise content to include in the mapping.

Example 20 includes one or more examples, and includes based on receipt of a packet, accessing the mapping to determine a processor to process the received packet and provide received packet to a queue associated with determined processor.

The invention claimed is:

1. An apparatus comprising:

a network interface device comprising:

a host interface;

a direct memory access (DMA) circuitry;

a network interface; and circuitry to:

receive packet data to be egressed in an express Data Path (XDP) raw frame, and based on the XDP raw frame, generate a mapping of ingress packets-to-targets comprising flow-to-destination steering data, wherein a target of the targets comprises a queue or a core.

2. The apparatus of claim 1, wherein the generate the mapping of ingress packets-to-targets is based on a type of packet data or content of a descriptor that indicates locations of one or more header fields.

3. The apparatus of claim 1, wherein:

the generate the mapping of ingress packets-to-targets is based on content of a descriptor, the descriptor is to identify one or more fields of the packet data that comprise content to include in the mapping, and the one or more fields of the packet data comprise a source address (SA) or destination address (DA).

4. The apparatus of claim 3, wherein the descriptor is to specify a depth of the received packet data to process to generate the mapping of ingress packets-to-targets.

5. The apparatus of claim 1, wherein the circuitry comprises a packet parser to process the packet data to generate the mapping of ingress packets-to-targets.

6. The apparatus of claim 1, wherein based on receipt of an ingress packet, access the mapping to determine a processor to process the ingress packet and provide the ingress packet to a queue associated with the determined processor.

7. The apparatus of claim 1, wherein the network interface device comprises one or more of: a network interface controller (NIC), a remote direct memory access (RDMA)-enabled NIC, SmartNIC, router, switch, forwarding element, infrastructure processing unit (IPU), or data processing unit (DPU).

8. The apparatus of claim 1, comprising a host system, wherein the host system is to execute a driver to cause generation of the mapping.

9. The apparatus of claim 8, comprising a data center comprising the host system and a second host system, wherein the network interface is to transmit the packet to the second host system and direct a packet received from the second host system to a target process based on the mapping of received packet-to-target.

10. The apparatus of claim 1, wherein the circuitry is to access the packet data from an sk_buff buffer.

11. At least one non-transitory computer-readable medium comprising instructions stored thereon, that if executed by one or more processors, cause the one or more processors to:

execute a driver to configure a network interface device to:

based on transmission of an egress frame, generate a descriptor to cause parsing of the egress frame to update an association of ingress packets to one or more queues or cores, wherein:

the network interface device comprises a host interface, a direct memory access (DMA) circuitry, and a network interface, the egress frame comprises an express Data Path (XDP) raw frame, and the association comprises flow-to-destination steering data.

12. The computer-readable medium of claim 11, wherein the descriptor is to cause a packet parser to process data of the egress frame based on the descriptor to generate the association of ingress packets to one or more queues or cores.

13. The computer-readable medium of claim 11, wherein the descriptor is to identify one or more fields of the egress frame that comprise content to include in the association of packets to one or more queues or cores.

14. The computer-readable medium of claim 11, wherein the descriptor is to specify a depth of the egress frame to process to generate the association of ingress packets to one or more queues or cores.

15. The computer-readable medium of claim 11, wherein the association of ingress packets to one or more queues or cores comprises a Receive Flow Steering (RFS) hash table.

16. A method comprising:

receiving, at a network interface device, packet data to be transmitted in an egress frame;

receiving, at the network interface device, a descriptor associated with the packet data; and processing, at the network interface device, the packet data based on the descriptor to generate a mapping of received packet-to-target queues or cores, wherein:

the network interface device comprises a host interface, a direct memory access (DMA) circuitry, and a network interface, the egress frame comprises an express Data Path (XDP) raw frame, and the mapping of received packet-to-target queues or cores comprises a flow-to-destination steering data.

17. The method of claim 16, wherein a packet parser performs the processing the packet data based on the descriptor to generate the mapping of received packet-to-target queues or cores.

18. The method of claim 16, wherein the descriptor is to identify one or more fields of the egress frame that comprise content to include in the mapping of received packet-to-target queues or cores.

19. The method of claim 16, comprising:

based on receipt of a packet, accessing the mapping to determine a processor to process the received packet and providing the received packet to a queue associated with the determined processor.

20. The method of claim 16, wherein the mapping of received packet-to-target queues or cores is associated with Receive Flow Steering (RFS).

* * * * *